(12) United States Patent
Resendes et al.

(10) Patent No.: US 7,214,741 B2
(45) Date of Patent: May 8, 2007

(54) PEROXIDE CURABLE BUTYL FORMULATIONS

(75) Inventors: Rui Resendes, Corunna (CA); Adam Gronowski, Samia (CA)

(73) Assignee: Lanxess Inc., Sarnia, Ontario (CA)

( * ) Notice: Subject to any disclaimer, the term of this patent is extended or adjusted under 35 U.S.C. 154(b) by 86 days.

(21) Appl. No.: 10/915,619

(22) Filed: Aug. 10, 2004

(65) Prior Publication Data

US 2005/0119382 A1    Jun. 2, 2005

(30) Foreign Application Priority Data

Aug. 14, 2003   (CA) .................................. 2438024

(51) Int. Cl.
*C08C 19/04*    (2006.01)
*C08F 8/06*    (2006.01)
(52) U.S. Cl. ..................... 525/387; 525/383; 526/348; 526/348.7; 526/335; 526/336; 526/346
(58) Field of Classification Search ................ 526/348, 526/348.7, 335, 336, 346
See application file for complete search history.

(56) References Cited

U.S. PATENT DOCUMENTS

| | | | |
|---|---|---|---|
| 3,862,265 A | 1/1975 | Steinkamp et al. | 260/878 R |
| 4,749,505 A | 6/1988 | Chung et al. | 252/51.5 A |
| 4,779,657 A * | 10/1988 | Cheung et al. | 152/510 |
| 5,578,682 A * | 11/1996 | White | 525/282 |
| 5,824,717 A * | 10/1998 | Merrill et al. | 522/81 |
| 2003/0187173 A1 | 10/2003 | Kaszas | 526/339 |
| 2004/0006184 A1* | 1/2004 | Gronowski et al. | 525/387 |

FOREIGN PATENT DOCUMENTS

| | | | |
|---|---|---|---|
| CA | 2 386 628 | * | 11/2003 |
| JP | 6-107738 | | 4/1994 |
| JP | 6-172547 | | 6/1994 |

* cited by examiner

*Primary Examiner*—Ling-Sui Choi
(74) *Attorney, Agent, or Firm*—Nicanor A. Kohnoke

(57) ABSTRACT

The present invention relates to a peroxide curable rubber compound containing at least one elastomeric polymer comprising repeating units derived from at least one $C_4$ to $C_7$ isomonoolefin monomer, at least one $C_4$ to $C_{14}$ multiolefin monomer, at least one p- or m-alkylstyrene monomer and at least one co-agent.

11 Claims, 2 Drawing Sheets

000
PEROXIDE CURABLE BUTYL FORMULATIONS

FIELD OF THE INVENTION

The present invention relates to a peroxide curable rubber compound containing at least one elastomeric polymer having repeating units derived from at least one $C_4$ to $C_7$ isomonoolefin monomer, at least one $C_4$ to $C_{14}$ multiolefin monomer, at least one p- or m-alkylstyrene monomer and at least one co-agent.

BACKGROUND OF THE INVENTION

Butyl rubber is known for its excellent insulating and gas barrier properties. Generally, commercial butyl polymer is prepared in a low temperature cationic polymerization process using Lewis acid-type catalysts, of which a typical example is aluminum trichloride. The process used most extensively employs methyl chloride as the diluent for the reaction mixture and the polymerization is conducted at temperatures on the order of less than −90° C., resulting in production of a polymer in a slurry of the diluent. Alternatively, it is possible to produce the polymer in a diluent which acts as a solvent for the polymer (e.g., hydrocarbons such as pentanes, hexanes, heptanes and the like). The product polymer may be recovered using conventional techniques in the rubber manufacturing industry.

In many of its applications, butyl rubber is used in the form of cured compounds. Vulcanizing systems usually utilized for butyl rubber include sulfur, quinoids, resins, sulfur donors and low-sulfur high performance vulcanization accelerators.

Peroxide curable butyl rubber compounds offer several advantages over conventional, sulfur-curing systems. Typically, these compounds display extremely fast cure rates and the resulting cured articles tend to possess excellent heat resistance. In addition, peroxide-curable formulations are considered to be "clean" in that they do not contain any extractable inorganic impurities (e.g. sulfur). The clean rubber articles can therefore be used, for example, in condenser caps, biomedical devices, pharmaceutical devices (stoppers in medicine-containing vials, plungers in syringes) and possibly in seals for fuel cells.

It is well accepted that polyisobutylene and butyl rubber decomposes under the action of organic peroxides. Furthermore, U.S. Pat. No. 3,862,265 and U.S. Pat. No. 4,749,505 teach us that copolymers of a $C_4$ to $C_7$ isomonoolefin with up to 10 wt. % isoprene or up to 20 wt. % para-alkylstyrene undergo a molecular weight decrease when subjected to high shear mixing. This effect is enhanced in the presence of free radical initiators.

One approach to obtaining a peroxide-curable butyl-based formulation lies in the use of conventional butyl rubber in conjunction with a vinyl aromatic compound like divinylbenzne (DVB) and an organic peroxide (see JP-A-107738/1994). In place of DVB, an electron-withdrawing group-containing a polyfunctional monomer (ethylene dimethacrylate, trimethylolpropane triacrylate, N,N'-m-phenylene dimaleimide) can also be used (see JP-A-172547/1994).

The disadvantage of these methods is that the resulting compound is contaminated with the low molecular weight reagents added to induce crosslinking, which did not fully react with the rubber in the solid state. Also, the action of peroxide on the regular butyl rubber may lead to formation of some low molecular weight compounds from the degraded rubber. The final articles based on such compounds may display an undesirable characteristic of leaching out the said low molecular species and accelerated aging.

A commercially available terpolymer based on IB, IP, and DVB, Bayer XL-10000, is curable with peroxides alone. While said commercial pre-crosslinked polymers exhibit excellent properties in many applications, they have a gel content of at least 50 wt. % which sometimes makes the even dispersion of fillers and curatives normally used during vulcanization difficult. This increases the likelihood of under- and over-cured areas within the rubbery article, rendering its physical properties inferior and unpredictable. Also, the Mooney viscosity of this rubber is high, usually 60–70 units (1'+8'@125° C.) which may cause significant processing difficulties, during mixing and sheeting stages.

Co-Pending Canadian Application CA-2,316,741 discloses terpolymers of isobutylene, isoprene and DVB prepared in the presence of a chain-transfer agent, such as diisobutylene, which are substantially gel-free and have an improved processability. Co-Pending Canadian Application CA-2,386,628 discloses peroxide curing and high purity applications for said terpolymers of isobutylene, isoprene and DVB prepared in the presence of a chain-transfer agent, such as diisobutylene. However, the presence of free DVB can present serious safety concerns. For these reasons, it would be desirable to have an isobutylene based polymer which is peroxide curable, completely soluble (i.e. gel free) and does not contain any DVB in its composition.

White et al. (U.S. Pat. No. 5,578,682) teach a process for obtaining a polymer composition comprising polymeric material selected from the group consisting of polypropylene, copolymers of propylene with up to 10 mole % ethylene, polyisobutylene, copolymers of a $C_4$ to $C_7$ isomonoolefin with up to 10 wt % isoprene, copolymers of a $C_4$ to $C_7$ isomonoolefin with up to 20 wt % of para-alkylstyrene and mixtures thereof, said polymeric material having a number average molecular weight in the range of from about 5,000 up to 5,000,000, and characterized as having a bimodal molecular weight distribution containing a lower molecular weight species and a higher molecular weight species, said higher molecular weight species comprising at least about 1.0 weight percent of said polymeric material. The polymer was mixed with a polyunsaturated crosslinking agent (and, optionally, a free radical initiator) and subjected to high shearing mixing conditions in the presence of organic peroxide. This patent is silent about an isoolefin-multiolefin-PAS (PAS=para-alkylstyrene) terpolymer and any filled compounds of modified polymers or the cure state of such compounds.

The present invention describes the preparation of butyl-based, peroxide-curable compounds which employ the use of an isoolefin-multiolefin-PAS terpolymer in conjunction with a peroxide initiator and co-agent. The present invention clearly demonstrates that there is an advantage associated with using a material which contains both a multiolefin and PAS in the polymer backbone.

SUMMARY OF THE INVENTION

The present invention provides a compound containing
a. at least one elastomeric polymer containing repeating units derived from at least one $C_4$ to $C_7$ isomonoolefin monomer, at least one $C_4$ to $C_{14}$ multiolefin monomer, at least one p- or m-alkylstyrene monomer,
b. at least one co-agent and
c. a peroxide curing system.

The present invention also relates to a vulcanized rubber part containing said peroxide-curable compound useful for high purity applications.

Also, the present invention includes a condenser cap containing said peroxide-curable compound interposed between a dynamic means and a static structure at a point of connection.

In addition, the present invention relates to a medical device comprising said peroxide-curable compound.

Further, the present invention relates to a sealing gasket (e.g. fuel cell gasket) containing an injection-moldable variant of the peroxide-curable compound.

DETAILED DESCRIPTION OF THE INVENTION

Figure 1:
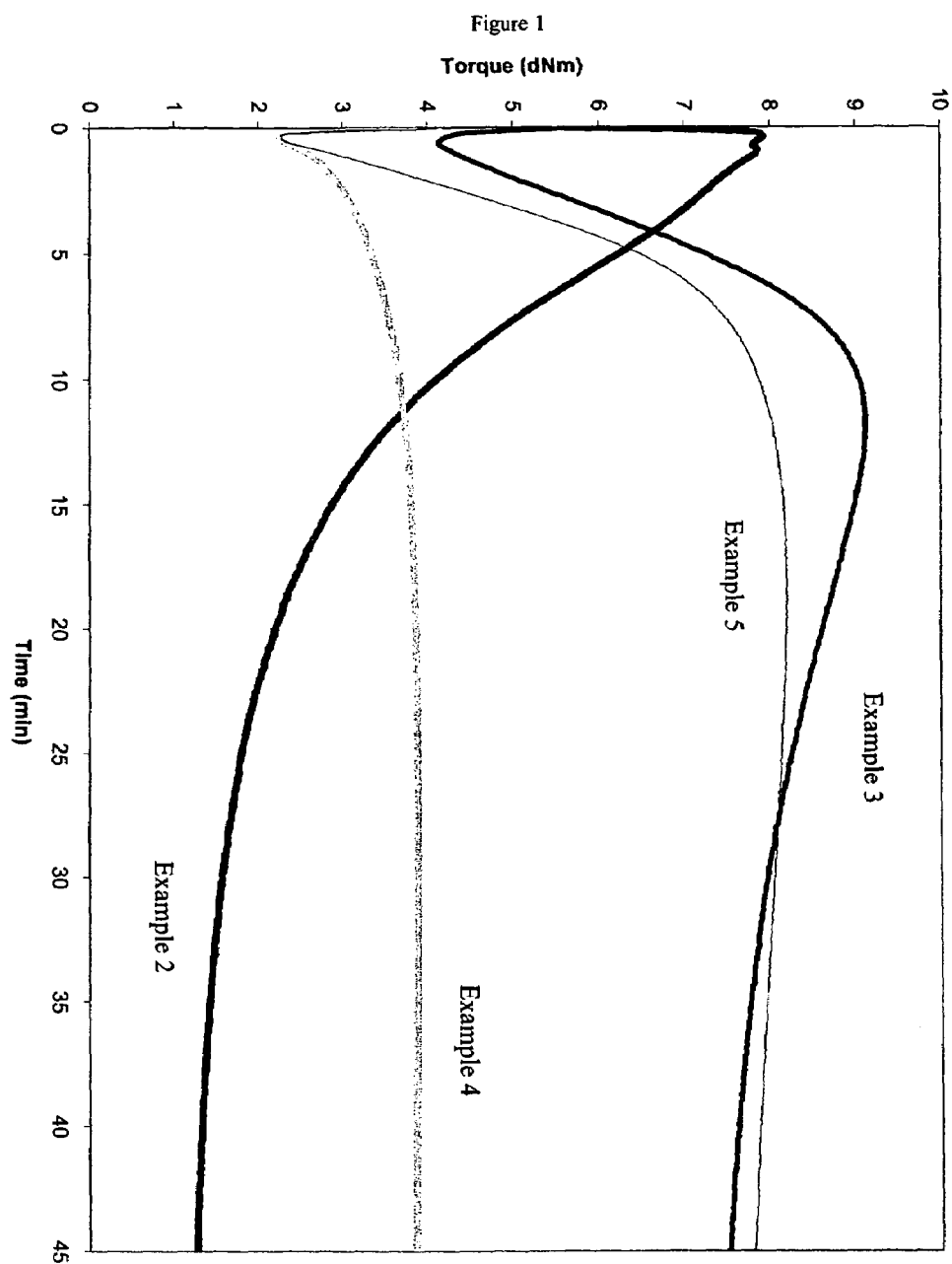
FIG. 1 illustrates MDR Cure Traces of the compounds of Examples 2–5

The present invention relates to butyl rubber polymers. The terms "butyl rubber", "butyl polymer" and "butyl rubber polymer" are used throughout this specification interchangeably. While the prior art in using butyl rubber refers to polymers prepared by reacting a monomer mixture containing a $C_4$ to $C_7$ isomonoolefin monomer and a $C_4$ to $C_{14}$ multiolefin monomer or β-pinene, the present invention preferably relates to elastomeric polymers derived from at least one $C_4$ to $C_7$ isomonoolefin monomer, at least one $C_4$ to $C_{14}$ multiolefin monomer, at least one p- or m-alkylstyrene monomer and optionally further copolymerizable monomers. The butyl polymer of the present invention are preferably non-halogenated.

In connection with the present invention, the term "substantially gel-free" is understood to denote a polymer containing less than 5 wt. % of solid matter insoluble in cyclohexane (under reflux for 60 min), preferably less than 3 wt. %, in particular less than 1 wt. %.

The present invention is not restricted to any particular $C_4$ to $C_7$ isomonoolefin monomer(s). Preferred $C_4$ to $C_7$ monoolefins include isobutylene, 2-methyl-1-butene, 3-methyl-1-butene, 2-methyl-2-butene, 4-methyl-1-pentene and mixtures thereof. The most preferred $C_4$ to $C_7$ isomonoolefin monomer is isobutylene.

Furthermore, the present invention is not restricted to any particular $C_4$ to $C_{14}$ multiolefin(s). However conjugated or non-conjugated $C_4$ to $C_{14}$ diolefins are preferably usefull. Preferred $C_4$ to $C_{14}$ multiolefin monomers include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene or mixtures thereof. The most preferred $C_4$ to $C_{14}$ multiolefin monomer is isoprene.

The present invention is not restricted to any particular p- or m-alkylstyrene monomer(s). Preferred p- or m-alkylstyrene monomers include methylstyrene, ethylstyrene and propylstyrene. The most preferred alkylstyrene monomer is p-methylstyrene.

Preferably, the monomer mixture to be polymerized contains in the range of from 70% to 98.99% by weight of at least one $C_4$ to $C_7$ isomonoolefin monomer, in the range of from 1.0% to 20% by weight of at least one $C_4$ to $C_{14}$ multiolefin monomer, and in the range of from 0.01% to 20% by weight of at least one p- or m-alkylstyrene monomer. More preferably, the monomer mixture contains in the range of from 70% to 98.9% by weight of a $C_4$ to $C_7$ isomonoolefin monomer, in the range of from 1.0% to 10% by weight of a $C_4$ to $C_{14}$ multiolefin monomer, and in the range of from 0.1% to 20% by weight of at least one p- or m-alkylstyrene monomer. It will be apparent to the skilled in the art that the total of all monomers will result in 100% by weight.

The monomer mixture may contain minor amounts of one or more additional polymerizable co-monomers. For example, the monomer mixture may contain a small amount of styrene, α-methylstyrene, p-chlorostyrene, p-methoxystyrene, indene (including indene derivatives) and mixtures thereof. If present, it is preferred to use the additional monomer(s) in an amount of up to 5.0% by weight of the monomer mixture. The values of the $C_4$ to $C_7$ isomonoolefin monomer(s) and/or the $C_4$ to $C_{14}$ multiolefin monomer(s) will have to be adjusted accordingly to result again in a total of 100% by weight.

The use of even other monomers in the monomer mixture is possible, provided, of course, that they are copolymerizable with the other monomers in the monomer mixture.

The present invention is not restricted to a special process for preparing/polymerizing the monomer mixture. This type of polymerization is well known to the skilled in the art and usually comprises contacting the reaction mixture described above with a catalyst system. Preferably, the polymerization is conducted at a temperature conventional in the production of butyl polymers—e.g., in the range of from −100° C. to +50° C. The polymer may be produced by polymerization in solution or by a slurry polymerization method. Polymerization is preferably conducted in suspension (the slurry method)—see, for example, Ullmann's Encyclopedia of Industrial Chemistry (Fifth, Completely Revised Edition, Volume A23; Editors Elvers et al., 290–292).

The present inventive polymer preferably has a Mooney viscosity ML (1+8@125° C.) in the range of from 5 to 70 units, more preferably in the range of from 20 to 50 units.

As an example, the polymerization can be conducted in the presence of an inert aliphatic hydrocarbon diluent (such as n-hexane) and a catalyst mixture containing a major amount (in the range of from 80 to 99 mole percent) of a dialkylaluminum halide (for example diethylaluminum chloride), a minor amount (in the range of from 1 to 20 mole percent) of a monoalkylaluminum dihalide (for example isobutylaluminum dichloride), and a minor amount (in the range of from 0.01 to 10 ppm) of at least one of a member selected from the group consisting of water, aluminoxane (for example methylaluminoxane) and mixtures thereof. Of course, other catalyst systems conventionally used to produce butyl polymers can be used to produce a butyl polymer which is useful herein—see, for example, "Cationic Polymerization of Olefins: A Critical Inventory" by Joseph P. Kennedy (John Wiley & Sons, Inc.© 1975, 10–12).

Polymerization may be performed both continuously and discontinuously. In the case of continuous operation, the process is preferably performed with the following three feed streams:

I) solvent/diluent+isomonoolefin(s) (preferably isobutene)

II) multiolefin(s) (preferably diene, isoprene), p- or m-alkylstyrene(s)

III) catalyst

In the case of discontinuous operation, the process may, for example, be performed as follows: The reactor, precooled to the reaction temperature, is charged with solvent or diluent and the monomers. The initiator is then pumped in the form of a dilute solution in such a manner that the heat of polymerization may be dissipated without problem. The course of the reaction may be monitored by means of the evolution of heat.

The compound further contains at least one co-agent. The present invention is not restricted to any particular co-agent and any co-agent that is known to enhance crosslinking of the elastomeric polymer of the present invention may be used. Preferred co-agents include bis dieneophiles such as HVA2 (=m-phenylene-bis-maleimide) or 1,3-bis(citraconimidomethyl)benzene (Perkalink 900) and allylic type co-agents such as triallyl cyanurate (TAC) and triallylisocyanurate (TAIC).

The compound further contains at least one peroxide curing system. The present invention is not limited to a special peroxide curing system. For example, inorganic or organic peroxides are suitable. Preferred are organic peroxides such as dialkylperoxides, ketalperoxides, aralkylperoxides, peroxide ethers, peroxide esters, such as di-tert.-butylperoxide, bis-(tert.-butylperoxyisopropyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl-cyclohexane, benzoylperoxide, tert.-butylcumylperoxide and tert.-butylperbenzoate. Usually the amount of peroxide in the compound is in the range of from 1 to 10 phr (=per hundred rubber), preferably from 4 to 8 phr. Subsequent curing is usually performed at a temperature in the range of from 100 to 200° C., preferably 130 to 180° C. Peroxides might be applied preferably in a polymer-bound form. Suitable systems are commercially available, such as Poly-dispersion T(VC) D-40 P from Rhein Chemie Rheinau GmbH, D (=polymer-bound di-tert-butylperoxy-isopropylbenzene).

Preferably, the compound further contains at least one active or inactive filler. The filler may include:
  highly disperseable silicas, prepared e.g. by the precipitation of silicate solutions or the flame hydrolysis of silicon halides, with specific surface areas of in the range of from 5 to 1000 m$^2$/g, and with primary particle sizes of in the range of from 10 to 400 nm; the silicas can optionally also be present as mixed oxides with other metal oxides such as those of Al, Mg, Ca, Ba, Zn, Zr and Ti;
  synthetic silicates, such as aluminum silicate and alkaline earth metal silicate like magnesium silicate or calcium silicate, with BET specific surface areas in the range of from 20 to 400 m$^2$/g and primary particle diameters in the range of from 10 to 400 nm;
  natural silicates, such as kaolin and other naturally occurring silica;
  glass fibers and glass fiber products (matting, extrudates) or glass microspheres;
  metal oxides, such as zinc oxide, calcium oxide, magnesium oxide and aluminum oxide;
  metal carbonates, such as magnesium carbonate, calcium carbonate and zinc carbonate;
  metal hydroxides, e.g. aluminum hydroxide and magnesium hydroxide;
  carbon blacks; the carbon blacks to be used here are prepared by the lamp black, furnace black or gas black process and have preferably BET (DIN 66 131) specific surface areas in the range of from 20 to 200 m$^2$/g, e.g. SAF, ISAF, HAF, FEF or GPF carbon blacks;
  rubber gels, especially those based on polybutadiene, butadiene/styrene copolymers, butadiene/acrylonitrile copolymers and polychloroprene;
  or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the tetrapolymer. For many purposes, the preferred mineral is silica, especially silica made by carbon dioxide precipitation of sodium silicate. Dried amorphous silica particles suitable for use in accordance with the present invention may have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil® S and Vulkasil® N, from Bayer AG.

It might be advantageous to use a combination of carbon black and mineral filler in the present inventive compound. In this combination the ratio of mineral fillers to carbon black is usually in the range of from 0.05 to 20, preferably 0.1 to 10. For the rubber composition of the present invention it is usually preferable to contain carbon black in an amount of in the range of from 20 to 200 parts by weight, preferably 30 to 150 parts by weight, more preferably 40 to 100 parts by weight.

Even if it is not preferred, the compound may further contain other natural or synthetic rubbers such as BR (polybutadiene), ABR (butadiene/acrylic acid-$C_1$-$C_4$-alkylester-copolymers), CR (polychloroprene), IR (polyisoprene), SBR (styrene/butadiene-copolymers) with styrene contents in the range of 1 to 60 wt %, NBR (butadiene/acrylonitrile-copolymers with acrylonitrile contents of 5 to 60 wt %, HNBR (partially or totally hydrogenated NBR-rubber), EPDM (ethylene/propylene/diene-copolymers), FKM (fluoropolymers or fluororubbers), and mixtures of the given polymers.

The rubber composition according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. Preferably the composition furthermore contains in the range of 0.1 to 20 phr of an organic fatty acid, preferably an unsaturated fatty acid having one, two or more carbon double bonds in the molecule which more preferably includes 10% by weight or more of a conjugated diene acid having at least one conjugated carbon-carbon double bond in its molecule. Preferably those fatty acids have in the range of from 8–22 carbon atoms, more preferably 12–18. Examples include stearic acid, palmitic acid and oleic acid and their calcium-, zinc-, magnesium-, potassium- and ammonium salts.

The ingredients of the final compound are mixed together, suitably at an elevated temperature that may range from 25° C. to 200° C. Normally the mixing time does not exceed one hour and a time in the range from 2 to 30 minutes is usually adequate. The mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

Furthermore, the present invention provides shaped vulcanized rubber parts for high purity applications containing substantially gel-free peroxide-curable compound. There are many high purity applications for which said rubber parts are suitable, such as containers for pharmaceuticals, such as stopper and seals for glass or plastic vials, tubes, parts of syringes and bags for medical and non-medical applications, condenser caps and seals for fuel cells, parts of electronic equipment, in particular insulating parts, seals and parts of containers containing electrolytes.

The present invention will be further illustrated by the following examples.

EXAMPLES

Methyl chloride (Dow Chemical) serving as a diluent for polymerization was transferred into a reactor by condensing from the vapor phase. Aluminum chloride (99.99%), HVA2 (=m-phenylene-bis-maleimide), and p-methylstyrene (PMS) (97%) were purchased from Aldrich Chemical Co, the aluminum chloride and HVA2 were used as received. Prior to use, the inhibitor was removed from p-methylstyrene by using an inhibitor removing disposable column from Aldrich. Isobutene and Isoprene were obtained internally and were dried prior to use, with the use of activated molecular sieves, to a moisture level of <10 ppm. The inhibitor was removed from isoprene by using an inhibitor removing disposable column from Aldrich.

The mixing of a compound with carbon black (IRB #7) and peroxide (DI-CUP 40C, Struktol Canada Ltd.) was done using a miniature internal mixer (Brabender MIM) from C. W. Brabender, consisting of a drive unit (Plasticorder® Type PL-V151) and a data interface module.

Curing was achieved with the use of an Electric Press equipped with an Allan-Bradley Programmable Controller.

Stress-strain tests were carried out using an Instron Testmaster Automation System, Model 4464.

The Mooney viscosity test was carried out according to ASTM standard D-1646 on a Monsanto MV 2000 Mooney Viscometer.

The Moving Die Rheometer (MDR) test was performed according to ASTM standard D-5289 on a Monsanto MDR 2000 (E). The upper die oscillated through a small arc of 1 degree.

Example 1

The terpolymer containing isobutylene, isoprene and para-methylstyrene was prepared in a pilot plant with the use of a 12 L batch reactor.

To 5586 g of methyl chloride was added 1344 g of isobutylene, 52.8 g of isoprene and 305 g of PMS. The reactor contents were cooled to −95° C. at which point an $AlCl_3$—$CH_3Cl$ catalyst solution was introduced. The rubber which was recovered from the reactor was mill dried and submitted for compositional analysis ($^1H$ NMR). The resulting polymer was found to contain 82.8 mol % isobutylene, 15.7 mol % PMS, and 1.49 mol % isoprene and was gel-free.

General Mixine Recipe

All of the compounds studied were composed of:

| Polymer: | 100 phr |
|---|---|
| Carbon black (IRB #7; N330): | 50 phr |
| Peroxide (DI-CUP 40 C): | 4 phr |
| Optionally, 2.5 phr of HVA-2 was also used. | |

Mixing was achieved with the use of a Brabender internal mixer (capacity ca. 75 g) with a starting temperature of 60° C. and a mixing speed of 50 rpm according to the following sequence:

| 0.0 min: | polymer added |
|---|---|
| 1.5 min: | carbon black added, in increments |
| 6.0 min: | peroxide added |
| 7.0 min: | co-agent (HVA-2) added |
| 8.0 min: | mix removed |

In cases where no co-agent was present, the peroxide was added 7.0 min into the mixing process. The final compound was refined on a 6"×12" mill.

Example 2

Comparative

This compound was based on a commercial polyisobutylene rubber (VISTANEX, MML-100) from Exxon according to the recipe presented above. In this case, 2.5 phr of HVA-2 were employed in the formulation. As can be seen from FIG. 1, no cure reactivity was evident in this system. In fact, the MDR trace reveals significant degradation. This observation is consistent with what is known about the free-radical degradation of PIB.

Example 3

Comparative

This compound was based on a commercial butyl rubber (Bayer Butyl 402, isobutylene content=97.9 mol %, isoprene content=2.1 mol %) according to the recipe presented above. In this case, 2.5 phr of HVA-2 was employed in the formulation. As can be seen from FIG. 1 and Table 1, significant cure reactivity is observed for this system. This suggests that the presence of IP in the polymer main chain is an important factor in determining the peroxide-curability of polyisobutylene based copolymers. It is also important to note that a significant degree of reversion is seen for this system. This suggests that a chain degradation mechanism may be acting in conjunction with the crosslinking reaction.

Example 4

Comparative

This compound was based on the IB-IP-PMS terpolymer described above according to the recipe already presented. In this case, HVA-2 was omitted from the formulation. As can be seen from FIG. 1 and Table 1, this compound possessed a very small amount of cure reactivity. Interestingly, there appears to be no indication of significant degradation (i.e. reversion). This suggests that the PMS component of the polymer backbone may be acting to inhibit main chain free radical degradation.

Example 5

Figure 2:
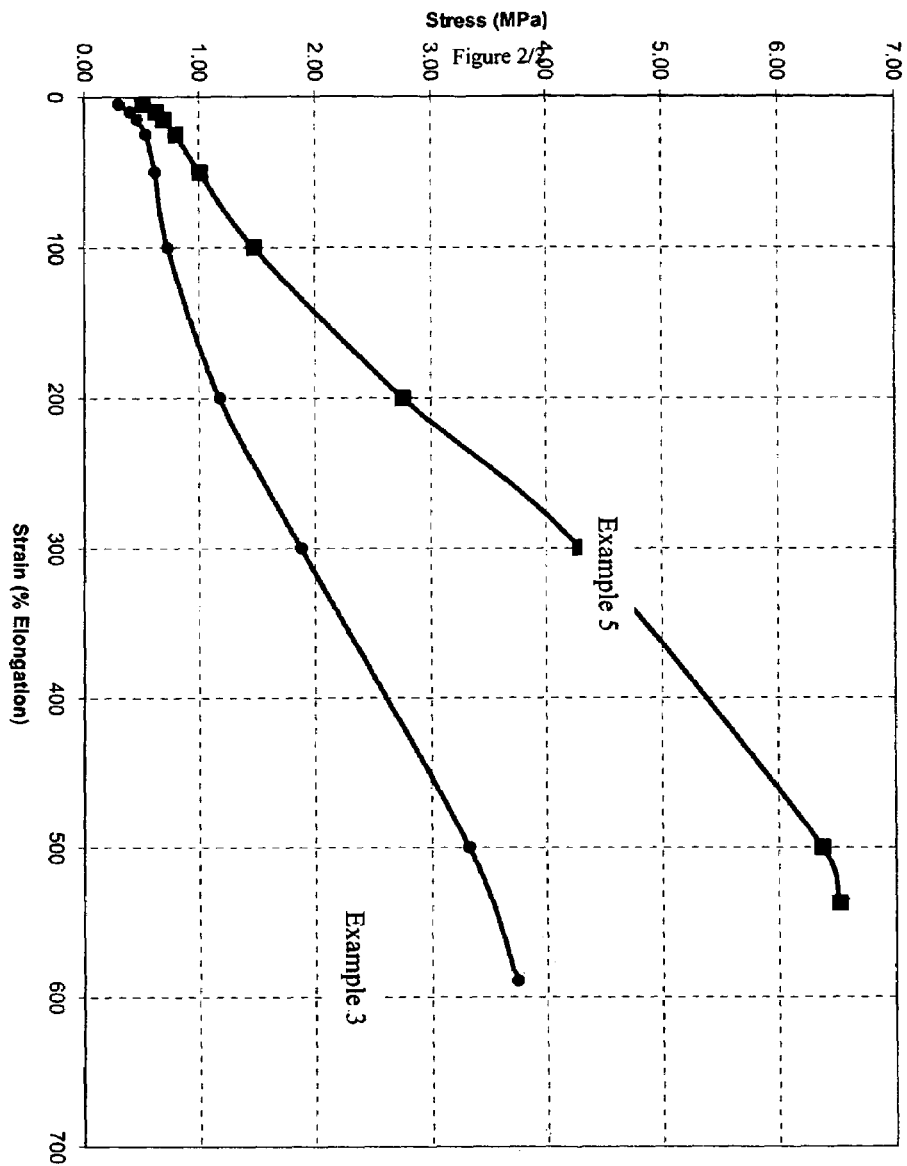
FIG. 2 illustrates Stress-Strain Profiles of the compounds of Examples 3 and 5

This compound was based on the IB-IP-PMS terpolymer described above according to the recipe already presented. In this case, 2.5 phr of HVA-2 was employed in the formulation. As can be seen from FIG. 1 and Table 1, this system possesses the highest degree of cure reactivity. Importantly, no significant reversion was evident from the MDR trace (c.f. Example 2). This suggests that the presence of PMS in the polymer chain both contributes to the cure reactivity and aids in the stabilization of the cured article. The degree of reinforcement was also found to be superior to that observed for Example 2 (FIG. 2).

TABLE 1

Physical Properties of Cured Articles

|  | Example 1 | Example 2 | Example 3 | Example 4 |
|---|---|---|---|---|
| Δ Torque (dNm) | — | 4.99 | 1.64 | 5.93 |
| Tensile 300% (MPa) | — | 1.88 | 1.01 | 4.24 |
| Ultimate Tensile (MPa) | — | 3.74 | 0.44 | 6.52 |
| Ultimate Elongation (%) | — | 589 | 3469 | 519 |
| Hardness, Shore A (Pts) | — | 44 | 43 | 55 |

The preceding examples serve to illustrate the utility of IB-IP-PMS terpolymers in the preparation of peroxide-curable, butyl based rubber formulations. Since the starting rubber is completely soluble, of moderate Mooney (i.e. ease of processing) and does not contain any DVB (safer material to manufacture and handle), this concept represents an attractive alternative to XL-10000 based formulations.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A compound comprising:
    a. at least one elastomeric polymer comprising repeating units derived from at least one $C_4$ to $C_7$ isomonoolefin monomer, at least one $C_4$ to $C_{14}$ multiolefin and at least one p- or m-alkylstyrene monomer in an amount of from 10% to 20% by weight of the total of all monomers;
    b. at least one co-agent selected from dienephiles and allylic type co-agents; and
    c. a peroxide curing system.

2. The compound according to claim 1, wherein the $C_4$ to $C_7$ isomonoolefin monomer(s) are selected from the group consisting of isobutylene, 2-methyl-1-butene, 3-methyl-1-butene, 2-methyl-2-butene, 4-methyl-1-pentene and mixtures thereof.

3. The compound according to claim 1, wherein the $C_4$ to $C_{14}$ multiolefin monomer(s) are selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

4. The compound according to claim 1, wherein the alkylstyrene monomer(s) are selected from the group consisting of p- or m-methylstyrene, p- or m-ethylstyrene and 4- or 3-n-propylstyrene.

5. The compound according to claim 1, wherein the co-agent(s) are selected from the group consisting of m-phenylene-bis-maleimide, 1,3-bis(citraconimidomethyl)benzene, triallyl cyanurate and triallyl isocyanurate and mixtures thereof.

6. The compound according to claim 1, wherein the peroxide system is an organic peroxide.

7. The compound according to claim 1, further comprising at least one filler.

8. A shaped article comprising a compound according to claim 1.

9. The article according to claim 8 in the form of a medical device or a condenser cap.

10. A medical device comprising an article comprising a compound according to claim 1.

11. A fuel cell comprising an article according to claim 8.

* * * * *